United States Patent
Rohleder et al.

(10) Patent No.: US 9,781,120 B2
(45) Date of Patent: Oct. 3, 2017

(54) SYSTEM ON CHIP AND METHOD THEREFOR

(71) Applicants: Michael Rohleder, Unterschleissheim (DE); Gary Hay, Motherwell (GB); Thomas Luedeke, Oberbergkirchen (DE); Stephan Mueller, Taunusstein (DE)

(72) Inventors: Michael Rohleder, Unterschleissheim (DE); Gary Hay, Motherwell (GB); Thomas Luedeke, Oberbergkirchen (DE); Stephan Mueller, Taunusstein (DE)

(73) Assignee: NXP USA, Inc., Austin, TX (US)

(*) Notice: Subject to any disclaimer, the term of this patent is extended or adjusted under 35 U.S.C. 154(b) by 16 days.

(21) Appl. No.: 14/899,338

(22) PCT Filed: Jul. 18, 2013

(86) PCT No.: PCT/IB2013/055907
§ 371 (c)(1),
(2) Date: Dec. 17, 2015

(87) PCT Pub. No.: WO2015/008112
PCT Pub. Date: Jan. 22, 2015

(65) Prior Publication Data
US 2016/0156632 A1  Jun. 2, 2016

(51) Int. Cl.
*G06F 12/14* (2006.01)
*G06F 21/62* (2013.01)
(Continued)

(52) U.S. Cl.
CPC .............. *H04L 63/101* (2013.01); *G06F 1/00* (2013.01); *G06F 21/30* (2013.01); *G06F 21/60* (2013.01);
(Continued)

(58) Field of Classification Search
CPC . G06F 1/00; G06F 21/30; G06F 21/60; G06F 21/70; G06F 21/78; G06F 21/79; H04L 63/08; H04L 63/101; H04L 63/104
See application file for complete search history.

(56) References Cited

U.S. PATENT DOCUMENTS 4,890,223 A  12/1989  Cruess et al.
6,292,888 B1  9/2001  Nemirovsky et al.
(Continued)

FOREIGN PATENT DOCUMENTS

JP  2003150450  5/2003
JP  2009524140  6/2009
(Continued)

OTHER PUBLICATIONS

Fiorin, Leandro, et al. "A data protection unit for NoC-based architectures." Proceedings of the 5th IEEE/ACM international conference on Hardware/software codesign and system synthesis. ACM, 2007.*
(Continued)

*Primary Examiner* — Michael Simitoski (57) ABSTRACT

A system on chip comprises a responder unit comprising a set of responder elements and an access control unit associated with an authorization list and the responder unit. An entry of the authorization list defines a set of access requirements in relation to an address space identifying at least part of the responder unit. The access control unit is arranged to: receive a request for access to a target responder element among the responder elements of the responder unit, determine the corresponding set of access requirements for the received access request from the authorization list, and evaluate the request for access with respect to the determined set of access requirements and generate a first request evaluation result. A protection unit associated with the responder unit is arranged to: provide a group assignment
(Continued)

assigning a group to each of the responder elements of the responder unit, provide a group authorization list, an entry of the group authorization list defining a set of group access requirements for the group assigned, receive the request for access to the target responder element, determine the group assigned to the target responder element from the group assignment and further determine the set of group access requirements from the group authorization list for the group assigned. The system-on-chip also evaluates the request with respect to the determined set of group access requirements and generates a second request evaluation result. Interaction with the target responder element is controlled in response to the first and/or second evaluation result.

12 Claims, 6 Drawing Sheets (51) Int. Cl.
| | |
|---|---|
| *G06F 21/76* | (2013.01) |
| *H04L 29/06* | (2006.01) |
| *G06F 21/78* | (2013.01) |
| *G06F 1/00* | (2006.01) |
| *G06F 21/30* | (2013.01) |
| *G06F 21/60* | (2013.01) |
| *G06F 21/79* | (2013.01) |
| *G06F 21/70* | (2013.01) |
| *G06F 13/00* | (2006.01) |

(52) U.S. Cl.
CPC .............. *G06F 21/70* (2013.01); *G06F 21/78* (2013.01); *G06F 21/79* (2013.01); *H04L 63/08* (2013.01)

(56) References Cited

U.S. PATENT DOCUMENTS

| | | | |
|---|---|---|---|
| 6,775,750 B2* | 8/2004 | Krueger .............. | G06F 12/1483 710/200 |
| 6,981,149 B1* | 12/2005 | Housley ................... | H04L 9/06 713/166 |
| 7,107,382 B2 | 9/2006 | Clayton | |
| 7,478,178 B2 | 1/2009 | Torudbakken et al. | |
| 7,512,761 B2 | 3/2009 | Kwon | |
| 7,543,126 B2 | 6/2009 | Lewis | |
| 7,558,923 B1 | 7/2009 | Bennett et al. | |
| 7,710,758 B2 | 5/2010 | Jo | |
| 7,793,345 B2 | 9/2010 | Weber et al. | |
| 7,921,431 B2 | 4/2011 | Smart | |
| 7,996,593 B2 | 8/2011 | Blackmore et al. | |
| 7,996,836 B1 | 8/2011 | Mccorkendale et al. | |
| 8,036,243 B2 | 10/2011 | Georgiou et al. | |
| 8,069,325 B2 | 11/2011 | Vermeulen et al. | |
| 8,135,962 B2 | 3/2012 | Strongin et al. | |
| 8,346,997 B2 | 1/2013 | Freimuth et al. | |
| 8,719,526 B2* | 5/2014 | Chen .................. | G06F 12/1458 711/100 |
| 8,789,170 B2* | 7/2014 | Sastry ................. | G06F 12/1458 726/1 |
| 9,336,411 B2* | 5/2016 | Rohleder ............... | G06F 21/74 |
| 2004/0199700 A1 | 10/2004 | Clayton | |
| 2005/0091432 A1 | 4/2005 | Adams et al. | |
| 2005/0132365 A1 | 6/2005 | Madukkarumukumana et al. | |
| 2005/0246453 A1 | 11/2005 | Erlingsson et al. | |
| 2006/0041705 A1 | 2/2006 | Bueti et al. | |
| 2006/0075146 A1 | 4/2006 | Schoinas et al. | |
| 2006/0090053 A1 | 4/2006 | Boning | |
| 2006/0123416 A1 | 6/2006 | Cibrario Bertolotti et al. | |
| 2006/0129747 A1* | 6/2006 | Weber ..................... | G06F 21/78 711/100 |
| 2006/0195618 A1 | 8/2006 | Arndt et al. | |
| 2006/0195645 A1 | 8/2006 | Ryan et al. | |
| 2006/0212606 A1 | 9/2006 | Arndt et al. | |
| 2007/0005919 A1 | 1/2007 | van Riel | |
| 2007/0039045 A1 | 2/2007 | McKee et al. | |
| 2007/0192518 A1 | 8/2007 | Rupanagunta et al. | |
| 2009/0083829 A1 | 3/2009 | Peterson | |
| 2009/0157979 A1 | 6/2009 | Gregg et al. | |
| 2009/0230255 A1 | 9/2009 | Lemonovich et al. | |
| 2009/0275407 A1 | 11/2009 | Singh et al. | |
| 2010/0042759 A1 | 2/2010 | Srinivasan et al. | |
| 2010/0162243 A1 | 6/2010 | Barde et al. | |
| 2010/0180056 A1 | 7/2010 | Matsuse | |
| 2010/0268905 A1 | 10/2010 | Reipold et al. | |
| 2010/0318822 A1 | 12/2010 | Scandurra et al. | |
| 2011/0067114 A1 | 3/2011 | Weber et al. | |
| 2011/0119423 A1 | 5/2011 | Kishore et al. | |
| 2011/0191562 A1 | 8/2011 | Chou et al. | |
| 2012/0079479 A1 | 3/2012 | Hakewill | |
| 2012/0117301 A1 | 5/2012 | Wingard | |
| 2013/0111168 A1 | 5/2013 | Circello et al. | |
| 2014/0137231 A1* | 5/2014 | Sastry ................... | G06F 13/385 726/16 |
| 2014/0259128 A1* | 9/2014 | Fear ......................... | H04L 63/08 726/5 |
| 2016/0028728 A1* | 1/2016 | Hampel .............. | H04L 63/0876 713/156 |
| 2016/0350549 A1* | 12/2016 | Hampel ................ | G06F 21/558 |

FOREIGN PATENT DOCUMENTS

| | | |
|---|---|---|
| KR | 100866951 | 11/2008 |
| WO | 2014041395 A1 | 3/2014 |
| WO | 2014080247 A1 | 5/2014 |
| WO | 2014080248 A1 | 5/2014 |

OTHER PUBLICATIONS

International Search Report for International application No. PCT/IB2013/055909 dated Apr. 28, 2014.
U.S. Appl. No. 14/442,241, filed May 12, 2015.
U.S. Appl. No. 14/647,089, filed May 23, 2015.
Notice of Allowance, U.S. Appl. No. 14/422,058, May 5, 2017, 22 pages.
Intel: "PCI-SIG Single Root I/0 Virtualization (SR-IOV) Support in Intel® Virtualization Technology for Connectivity", Efficient Native Sharing of I/0 Devices with Virtual Machines for enhancing I/0 Performance, White Paper, Rev. 06/08-001US, 2008, pp. 1-4.
U.S. Appl. No. 14/483,273, filed Sep. 11, 2014.
Non-Final Office Action, U.S. Appl. No. 14/483,273, dated Dec. 9, 2016, 16 pages.
Notice of Allowance, U.S. Appl. No. 14/483,273, dated Mar. 23, 2017, 5 pages.
U.S. Appl. No. 14/422,058, filed Feb. 17, 2015.
Notice of Allowance, U.S. Appl. No. 14/422,058, dated Mar. 29, 2017, 16 pages.
Non-Final Office Action, U.S. Appl. No. 14/422,058, dated Feb. 3, 2017, 5 pages.
Final Office Action, U.S. Appl. No. 14/647,089, dated Mar. 15, 2017, 40 pages.
Non-Final Office Action, U.S. Appl. No. 14/647,089, dated Jun. 30, 2016, 31 pages.
Notice of Allowance, U.S. Appl. No. 14/442,241, dated Jan. 29, 2016, 8 pages.
Non-Final Office Action, U.S. Appl. No. 14/442,241, dated Nov. 6, 2015, 4 pages.
Notice of Allowance, U.S. Appl. No. 14/483,273, dated Apr. 21, 2017, 13 pages.

* cited by examiner

| # | reg name | group |
|---|---|---|
| 1 | GCR | G1,G2,G3 |
| 2 | SR | G1,G2,G3 |
| 3 | IMR1 | G1 |
| 4 | IMR2 | G2 |
| 5 | IMR3 | G3 |
| 6 | CH1_DR | G1 |
| 7 | CH1_SR | G1 |
| 8 | CH12_TR | G1,G2 |
| 9 | CH2_DR | G2 |
| 10 | CH2_SR | G2 |
| 11 | CH3_DR | G3 |
| 12 | CH3_SR | G3 |

Fig. 6

| Group | Task,Master | Access |
|---|---|---|
| G1 | T*,{M0,M1} | us-r |
| G2 | T2,M1 | s-r |
| G3 | {T2,T99,T133},M* | s-rw |
| G4 | T*,M* | su-rw |
| G5 | {T2,T3},{M0-M7} | u-r |

| Legend: | |
|---|---|
| T* | any task is allowed |
| T1 | Task1 is allowed |
| {T2,T99} | Task2 and Task 99 are allowed |
| M* | any master is allowed |
| M1 | Master 1 is allowed |
| {M0,M1} | Master 0 and Master 1 are all. |
| u | user access permitted |
| s | supervisor access permitted |
| r | read access permitted |
| w | write access permitted |

SYSTEM ON CHIP AND METHOD THEREFOR

FIELD OF THE INVENTION

This invention relates to a system-on-chip and a method therefor.

BACKGROUND OF THE INVENTION

A system on a chip or system-on-chip (SoC) is an integrated circuit (IC) that comprises several functional units on a single chip. A system on chip may, for instance, be used as an embedded system in, e.g., a motor vehicle, mobile phone, or manufacturing plant. An SoC may notably comprise one or more requestor units in the form of, e.g., one or more microprocessors, direct memory access (DMA) controllers or other bus masters capable of requesting a transaction. The SoC may further comprise a number of subordinate units, e.g., memory blocks or peripheral units (peripherals) arranged to respond to the transaction request; further named responder units. Each requestor unit may be programmable or non-programmable. A programmable requestor unit may comprise or be connected to a program memory and arranged to read program code in the form of executable instructions from the program memory and to execute these instructions. For instance, the SoC may comprise a memory, e.g., a flash memory, the non-volatile memory carrying the program code.

Today's SoCs often comprise a program memory sufficiently large to allow a user or developer to add additional software to the SoC in order to provide additional functions. Such additional functions or add-ons, sometimes referred to as guest programs, may also make use of memory or the peripherals within the SoC. For instance, a manufacturer of a SoC may manufacture a basic SoC that provides a certain number of functions and still has sufficient capacity for allowing a customer to add customer-specific functions to the SoC. In this case, it may be important to shield the original system, i.e., the basic SoC, against such additions to ensure the integrity and stability of the original system.

As computing power has increased, the operating systems supporting the software applications of the SoC have increased in sophistication and complexity such that so-called virtualization can now be employed in the field of embedded computing systems, which find many applications, for example in the automotive industry. In this context, "virtualization" refers to the various techniques, methods or approaches of creating a virtual (rather than actual) version of something, such as a virtual hardware platform. In the field of SoCs, so-called hardware-assisted virtualization techniques are employed, which involves specially designed hardware components for this purpose. These components may assist in reducing the need to modify guest programs. As an example, a memory management unit (MMU) or memory protection unit (MPU) can be used to respond to any access to a shared resource, for example a set of memory regions, or one or multiple hardware blocks, with a software interrupt or exception that can then be used to implement the functionality of a hypervisor, the software used to create virtual machines on host hardware. This implementation is costly, for example there is an IPS (Instructions Per Second) penalty, but it may assist in enabling the running of existing guest programs more or less unmodified on a virtualized hardware platform.

Such a scheme also enables the partition of guest programs in virtual systems, where the software executing within one partition is not permitted to influence the software executing in another partition, and vice-versa. This is especially beneficial for systems targeted towards executing multiple applications where at least one is in a functional safety domain. For such systems, freedom of interference between the various applications running is a key requirement. However, as intimated above, freedom from interference is an issue when accessing hardware blocks, due to the very fine granularity of the partitioning required, which is often at least at the level of individual registers within such a hardware block. The hardware components mentioned above only support the definition of a very limited amount of address ranges as the basis for a corresponding partitioning, where the resulting granularity is often also too coarse to allow a single register to be protected.

Furthermore, the cost of implementing an address range based protection scheme for the hardware-assisted virtualization of one or multiple hardware blocks is prohibitively high. For example, hardware blocks can contain a large amount of registers, often in the range of 100's to 1000's of registers, of varying sizes, usually 8-bit, 16-bit, or 32-bit wide, and sometimes even wider registers are provided. Furthermore, the set of registers related to a certain feature within a single hardware block is often distributed over the memory range occupied by this hardware block. Such a distribution does not always have a consistently discernible mapping to address ranges. With an address range based protection scheme, this could result in the need to use multiple address ranges to protect a single feature. Protecting the multiple features implemented by such a hardware block, could therefore result in the need for a large amount of address ranges for protection purposes. However, the cost of the hardware-assisted protection of a single address range is very high, and so the amount of available address ranges is significantly limited. In this regard, the hardware-assisted protection provided has to accommodate protection information, requiring for example about 50 to 100 flip-flops to store an address range, protection attributes and any other required information. Also, for every access request concurrent checks of all specified protection address ranges are required, resulting in a need to implement a large set of comparators, and this influences hardware design considerations, for example critical timing path considerations within the system.

Additionally, any technique to protect hardware blocks needs to be compatible with existing, address based memory protection capabilities, because it is necessary to avoid re-designing an architecture of an SoC, especially when only a small amount of hardware blocks need to be protected, or when such protection has to be implemented together with other known address based protection capabilities.

SUMMARY OF THE INVENTION

The present invention provides a system-on-chip and a method therefor as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

According to a first example, there is provided a system-on-chip may comprise: a responder unit that may comprise a set of responder elements; an access control unit associated with an authorization list and the responder unit, an entry of the authorization list defining a set of access requirements in relation to an address space identifying at least part of the responder unit; wherein the access control unit may be arranged to: receive a request for access to a target responder element among the responder elements of the responder unit; determine the corresponding set of access requirements for the received access request from the authorization list; and evaluate the request for access with respect to the determined set of access requirements and generate a first request evaluation result; and a protection unit associated with the responder unit; the protection unit may be arranged to: provide a group assignment assigning a group to each of the responder elements of the responder unit; provide a group authorization list, an entry of the group authorization list defining a set of group access requirements for the group assigned; receive the request for access to the target responder element; determine the group assigned to the target responder element from the group assignment and further determine the set of group access requirements from the group authorization list for the group assigned; and evaluate the request with respect to the determined set of group access requirements and generate a second request evaluation result; and wherein interaction with the target responder element may be controlled in response to the first and/or second evaluation result.

The protection unit may be further arranged to control interaction with the target responder element by performing one or more of the following in dependence of the first and/or second evaluation results: grant the request for access; inhibit the request for access; or abort access initiated in response to the request.

The protection unit may be further arranged to generate an error indication and may be capable of communicating the error indication in dependence of the first and/or second evaluation results when access to the target responder element is being inhibited or aborted.

The protection unit may be arranged to provide a further group assignment and/or a further group authorization list to control access, when in use, to the target responder element.

The protection unit may be arranged to select between the group assignment and the further group assignment and/or the group authorization list and the further group authorization list in response to evaluating a predetermined criterion.

The predetermined criterion may be selection of the address space associated with an address identified in the received access request; the selection may be made from a set of address spaces associated with the responder unit comprising the target responder element.

The system may further comprise: a further protection unit arranged to provide a further group assignment and/or a further group authorization list; wherein the target responder element has a first access path associated with the protection unit and a second access path associated with the further protection unit.

The first access path may be associated with the address space and the second access path is associated with a further address space; and the address identified in the received access request may be used to select the first access path or the second access path.

The further protection unit may be arranged to assign another group to each of the responder elements of the responder unit; the another group may be different from the group assigned by the protection unit.

The further group authorization list may assign a further set of group access requirements to the group or the another group.

The authorization list may comprise a plurality of entries including the entry; each of the plurality of entries may define a respective set of access requirements in relation to a respective address space; and the access control unit may be arranged to select the entry associated with the address identified in the received access request identifying the part of the responder unit containing the target responder element.

According to a second example, there is provided an integrated circuit may comprise a system on chip as set forth above in relation to the first example.

According to a third example, there is provided a vehicle may comprise a system on chip as set forth above in relation to the first example.

According to a fourth example, there is provided a method of protecting a responder unit comprising a set of responder elements, the method may comprise: provide an authorization list, an entry of the authorization list defining a set of access requirements in relation to an address space identifying at least part of the responder unit; receiving a request for access to a target responder element among the responder elements of the responder unit; determining the corresponding set of access requirements for the received access request from the authorization list; and evaluating the request for access with respect to the determined set of access requirements and generate a first request evaluation result; and providing a group assignment assigning a group to each of the responder elements of the responder unit; providing a group authorization list, an entry of the group authorization list defining a set of group access requirements to the group; receiving the request for access to the target responder element; determining the corresponding group for the target responder element from the group assignment and further determining the corresponding set of group access requirements from the group authorization list; evaluating the request with respect to the determined set of group access requirements and generate a second request evaluation result; and controlling interaction with the target responder element in response to the first or second evaluation result.

Figure 1:
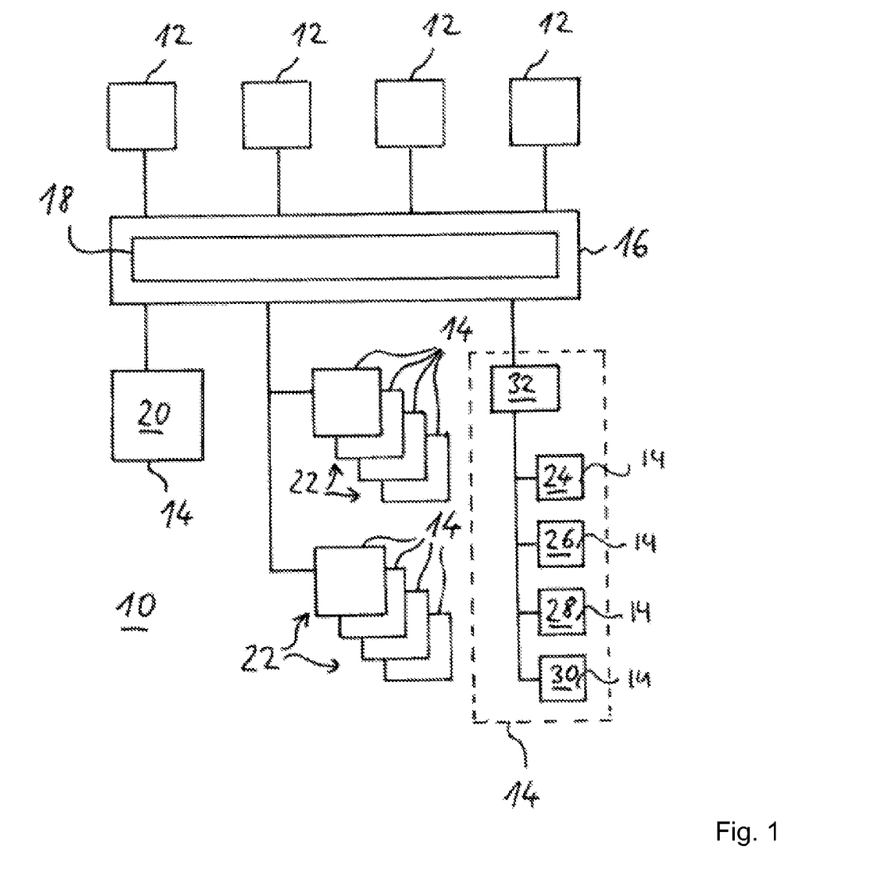
FIG. 1 is a schematic diagram of an example of a system-on-chip constituting an embodiment of the invention.

FIG. 1 shows a first example of a system on chip (SoC) 10. The SoC 10 may comprise one or more requestor units 12 and one or more responder units 14 (responders). The SoC 10 may, for instance, comprise the following responder units 14: a flash memory unit 20, two static random access memory (SRAM) units 22, and a group of integrated peripherals, 24, 26, 28, and 30 with a peripheral bridge 32. The SRAM units 22 may, for example, correspond to two contiguous address ranges implemented by multiple SRAM elements that are all responder units described herein as are the peripherals and the peripheral bridge and the flash. Each of the responder units 14 may be connected to each or at least some of the requestor units 12. The responder units 14 may, for instance, be connected to the requestor units 12 via an interface 16. The interface 16 may, for instance, be a crossbar switch for selectively connecting a given responder unit 14 to a given requestor unit 12 and disconnecting a given responder unit 14 from a given requestor unit 12.

Figure 2:
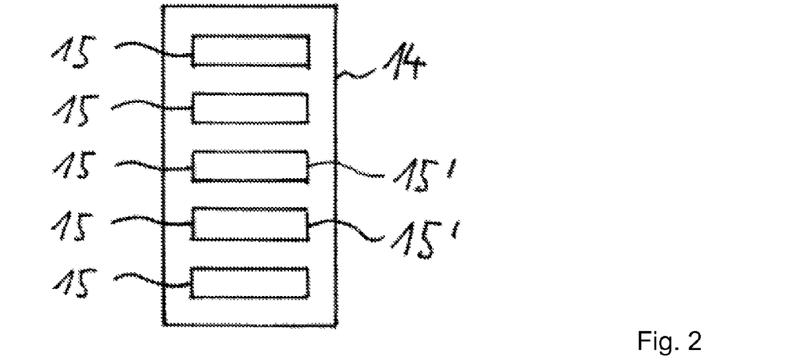
FIG. 2 is a schematic diagram of an example of a responder unit of FIG. 1.

Each of the responder units 14 may comprise a set of responder elements 15, as shown schematically in FIG. 2. Each responder element 15 may, for instance, be one of the following: a memory cell, a set of flip flops implementing a register (the flip flops may control a specific functionality within the responder element, implement one or more features or provide data that is retrieved from an input pin or provided to an output pin), or are related to any other kind of controllable hardware component. Each responder element may be software-visible, i.e., each responder element 15 may be connected to one or more of the requestor units 12 such that the respective responder element 15 can be accessed by the respective requestor unit 12 by executing one or more suitable software instructions. Although only five responder elements 15 are shown in FIG. 2, each responder unit 14 may, in practice, comprise a very large number of responder elements 15. A responder unit 14 may, for instance, comprise thousands or tens of thousands of software addressable registers as responder elements. The responder elements 15 of a given responder unit 14 may be arranged in responder objects, each responder object comprising one or more responder elements 15. The respective responder unit 14 may thus comprise one or more responder objects, each responder object comprising one or more responder elements 15. In the example of FIG. 1, each responder unit 14 may, for instance in the case of the SRAM units 22, comprise several memory blocks as responder objects, each memory page comprising a plurality of registers.

Referring back again to FIG. 1, the peripheral units 24, 26, 28, and 30 may, for instance, be a sensor unit, a timer unit, a communication unit, and a pulse-width modulation (PWM) unit, respectively. Each of these peripherals may provide a certain function, herein referred to as the original function. A certain subset of responder elements 15, e.g., registers, may be dedicated to the original function. Another subset of responder elements 15 may be used by a customer to install a second function on the same peripheral. For instance, the customer may implement some control of an external sensor on a control peripheral or some motor control on top of a breaking device. One or more of the requestor units 12 or, more specifically, program code for controlling the requestor units 12, may be extended or modified for this purpose.

It may be desired to make the original function of any selected one of the responder units 14 immune against any possible add-ons that may be installed on the SoC 10. It may notably be desired to prevent any add-on to access those responder elements 15 that are dedicated to the original function. Such protection may be crucial if the original function is a safety-relevant function such as control of a brake device, for instance.

The SoC 10 may therefore comprise an access control unit 18. The access control unit 18 may, for example, be integrated in the interface 16 or be connected parallel to it. The requestor units 12 may each be arranged to access any selected one or more of the responder elements 15 by issuing a corresponding request for access (not shown in FIGS. 1 and 2). The request may, for instance, specify a set of responder elements 15 as target responder elements 15' and a set of request properties. The request properties may, for instance, include information such as a type of operation to be performed on the target responder elements 15' and information associated with the respective requestor unit 12 that issued the request. The target responder element may be identified by an address contained in the request for access. Examples of different types of operations may include, for instance, write and read or set and get in a scenario in which the target responder elements 15' are memory cells, or registers. A read operation may be defined as an operation involving a transfer of information from the target responder elements 15' to the requesting requestor unit 12. A write operation may be defined as an operation involving a transfer of information from the requesting requestor unit 12 to the target responder elements 15'. A set operation may be defined as an operation involving a state change of the target responder elements 15'. A get operation may be defined as an operation involving a transfer of information from the target responder elements 15' to the requesting requestor unit 12 without changing the state of the target responder elements 15'.

The access control unit 18 may comprise protection information and may be arranged to grant or refuse the request depending on whether or not the request conforms to the protection information specified for the target responder elements 15'.

Figure 3:
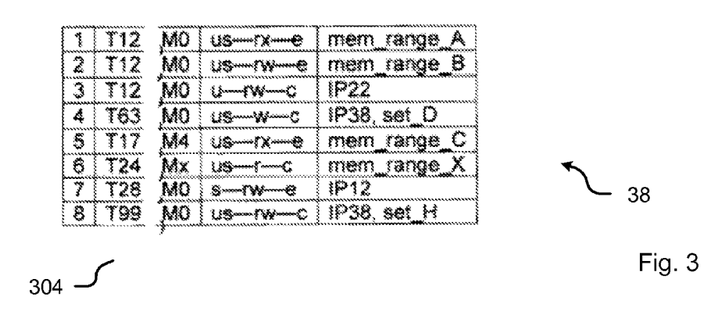
FIG. 3 is a schematic diagram of an example of an embodiment of an authorization list used by the system-on-chip of FIG. 1.

The protection information may, for instance, be defined in terms of an authorization list. An example of an authorization list 38 is schematically shown in FIG. 3. In the example shown, the authorization list comprises eight entries numbered 1 to 8. The authorization list may, however, comprise a far greater number of entries. In this example, each entry may specify, e.g., a task, a requestor unit, a set of access requirements, and a group of one or more responder elements. For instance, in this example, entries 1 to 3 may each specify a task T12 and a requestor unit M0. The task T12 and the requestor unit M0 may together form a first actor (T12, M0). In the example, the entries 4 to 8 may specify, respectively, the following actors: (T63, M0), (T17, M4), (T24, Mx), (T28, M0), and (T99, M0). The notation Mx in entry 6 may indicate that the entry may apply to any requestor unit. In this context, the letter x may indicate a wild card. Wild cards may be allowed in each portion of each entry of the authorization list.

In the example of FIG. 3, entries number 1 to 8 may further specify the following sets of access requirements, respectively: us-rx-e, us-rw-e, u-rw-c, us-w-c, us-rx-e, us-r-c, s-rw-e, and us-rw-c. The symbols u, s, r, w, x, e, and c may indicate, e.g., "user mode", "supervisor mode", "read permission", "write permission", "execute permission", "exclusive access", and "shared access", respectively. The entries 1 to 8 of the example may further specify the following groups of one or more responder elements, for example: mem_range_A, mem_range_B, IP22, set D of IP38, mem_range_C, mem_range_X, IP 12, and set H of IP 38. Each identifier, e.g., mem_range_A or IP22, may identify a specific group of responder elements within the responder elements 14. Each group of responder elements specified in the authorization list may be contained within a single responder unit 14. Alternatively, the group may extend across two or more responder units 14.

For the purpose of explanation of this particular aspect, a scenario in which a request for access to one or more responder elements within an integrated peripheral named IP38 is received, is considered. The peripheral IP38 may be one of the responder units 14 or be integrated therein. The access control unit 18, in response to receiving the request for access identifying the peripheral IP38, may select the entries 4 and 8 of the authorization list 38 as relevant entries because each of these entries specifies IP38, or only one of these entries. The address and size specified by the request for access may select one or more responder elements within this responder unit, which become the target responder elements 15' specified by the request of the present example. The access control unit 18 may then evaluate the request on the basis of the thus determined relevant protection data and thus generate a first evaluation result. The access control unit 18 may then, for example, grant or refuse the request or abort the requested access as a result of that further evaluation.

It is pointed out that the authorization list, e.g., the list 38 in FIG. 3 may be generated or updated, for example in response to a task switch of any one of the requestor units. For instance, the tasks listed in column 2 of the authorization list 38 in FIG. 3 may be tasks currently running on the requestor unit 12. For instance, requestor unit M0 may be running a task T12, T63, T28, and T99. When requestor unit M0 performs a task switch, it may stop running that task and start running a different task. The authorization list 38 may, in this case, be updated accordingly. Notably, the access requirements and responder elements associated with the new tasks may be included in the updated authorization list 38.

Although not shown in FIG. 1, the SoC 10 may also comprise two or more responder units 14 and two or more protection units 36. Each of the responder units 14 may have associated with it one of the protection units 36. The respective protection unit 36 may, for example, be operably coupled to the respective responder unit 14 or be integrated therein.

For the sake of completeness, it is noted that each of the responder units 14 may comprise one or more of the requestor units 12. Similarly, each of the requestor units 12 may comprise one or more of the responder units 14. In other words, a requestor unit may additionally act as a responder unit, and a responder unit may additionally act as a requestor unit, depending on the design.

Figure 4:
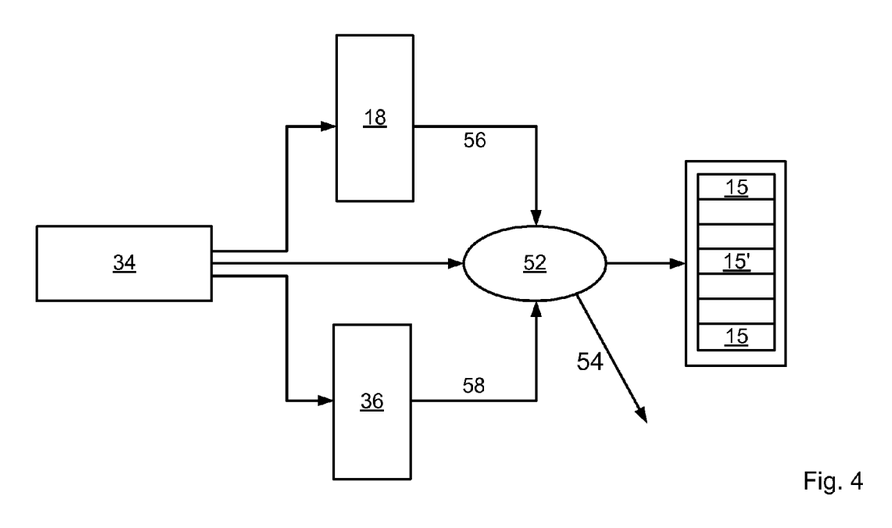
FIG. 4 is a schematic diagram of an example of a portion of the system-on-chip of FIG. 1 in greater detail.

Turning to FIG. 4, in a simple example, the request for access 34 may be received from a requestor 12 via the crossbar switch 16 (both units not shown in FIG. 4) and provided to the access control unit 18 and the protection unit 36. As mentioned above, the request for access 34 may comprise the address identifying a target responder element 15' and define a set of access requirements.

Control logic 52 may be provided and capable of communicating with the access control unit 18 and the protection unit 36. However, it should be appreciated that the protection unit 36 may comprise the control logic 52. The control logic 52 may be capable of communicating with any responder unit 14 and in particular any target responder element 15' amongst the responder elements 15. The control logic 52 may also provide an output for providing an error indication 54.

Figure 7:
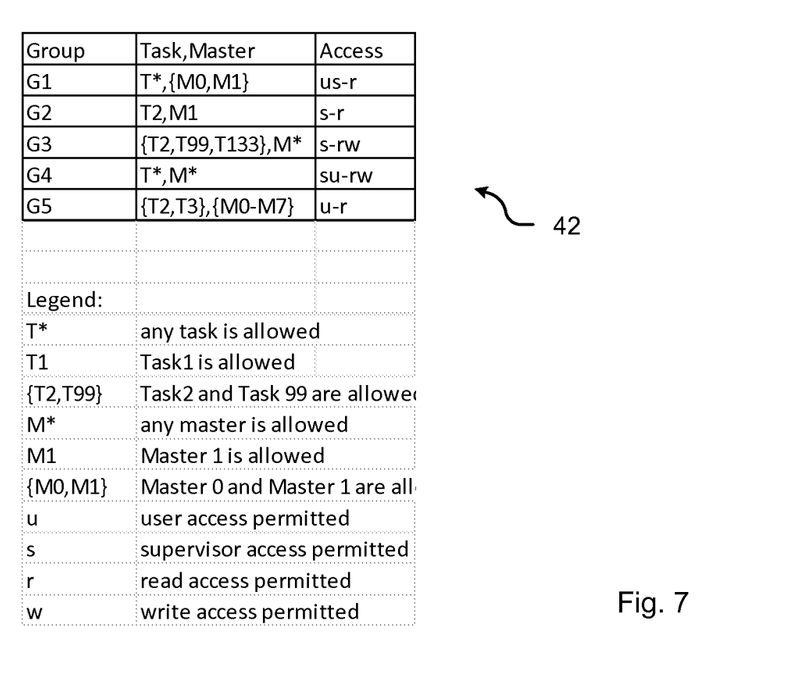
FIG. 7 is a schematic diagram of an example of a group authorization list used by the system-on-chip of FIG. 1.
Figure 8:
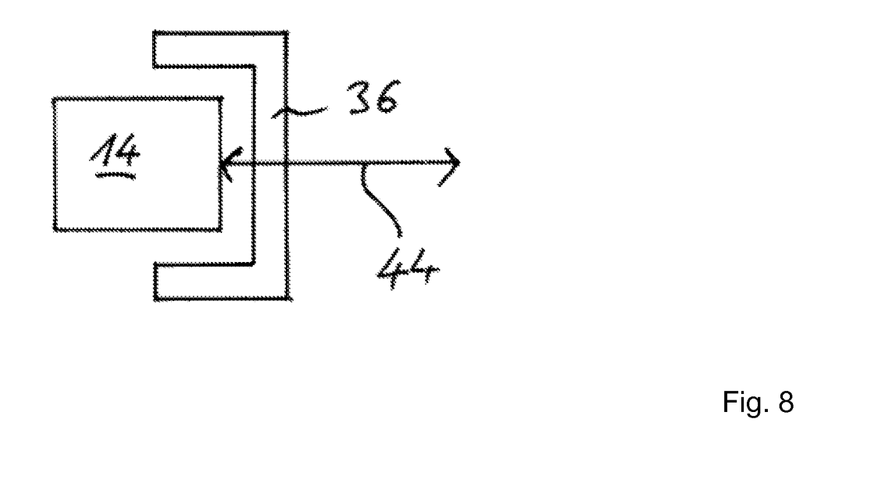
FIG. 8 is a schematic diagram of an example of a protection unit used by the system-on-chip of FIG. 1.
Figure 9:
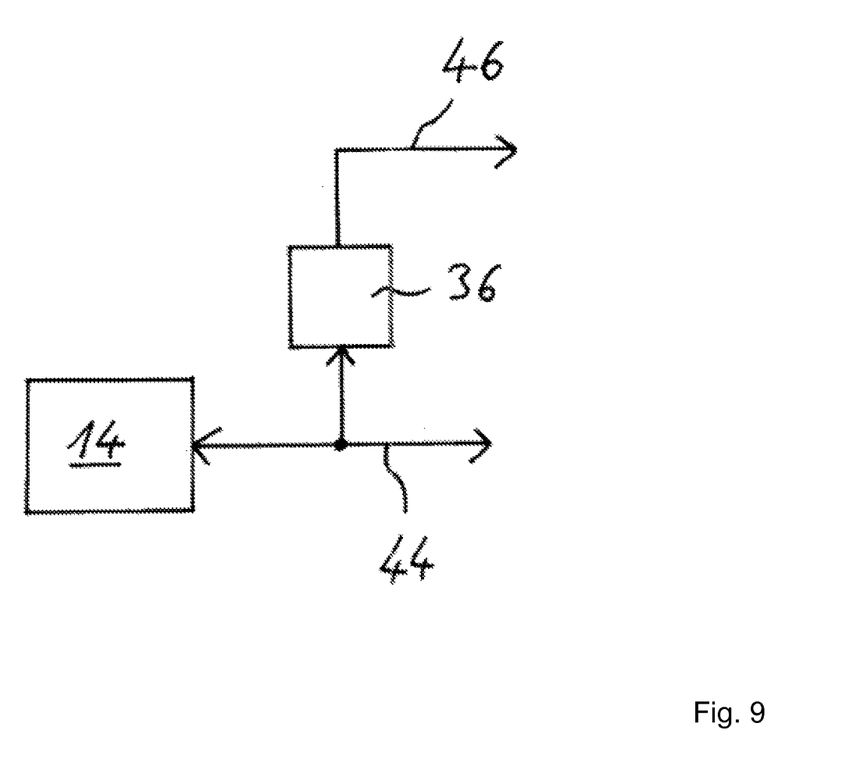
FIG. 9 is a schematic diagram of another example of a protection unit used by the system-on-chip of FIG. 1.

Referring now to FIGS. 7, 8 and 9, examples of one of the protection units 36 of the system on chip 10 mentioned above in reference to FIG. 4 are described. The protection units 36 of the SoC 10 may be of a like or similar design.

Figure 6:
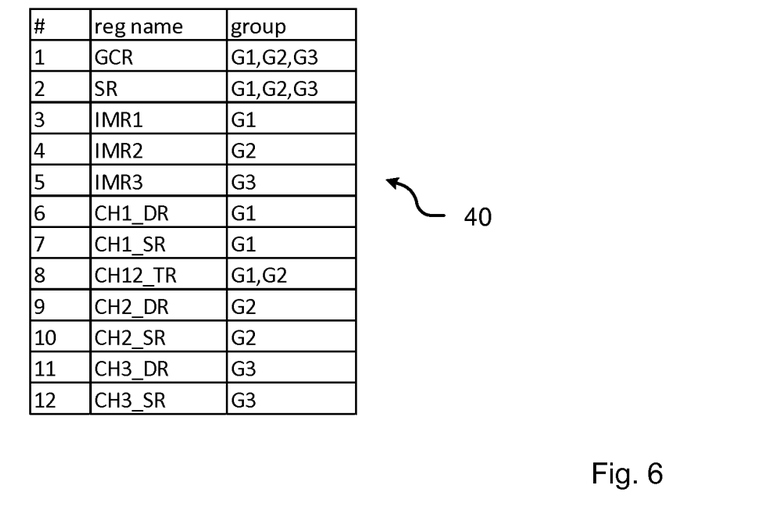
FIG. 6 is a schematic diagram of an example of a group assignment used by the system-on-chip of FIG. 1.

The protection unit 36 may be arranged to provide a group assignment 40 (FIG. 6). The group assignment 40 may assign one or more groups to each responder element or vice-versa of the associated responder unit 14. Each responder element 15 may thus be included in one or more groups or each group may consist of one or more responder elements. These groups may be referred to as protection groups. It is noted that such a group of responder elements 15 does not necessarily correspond to the physical arrangement of the responder elements 15 within the respective responder unit 14. For instance, two responder elements 15 provided in a common module of a responder unit 14 may be included in different groups. Furthermore, two responder elements belonging to different modules in the responder unit 14 may belong to the same group. The total number of groups thus defined may be smaller and even considerably smaller than the total number of responder elements in the responder unit 14 as more than one responder element may be assigned the same group. In other words, each group may comprise more than one responder element. For example, considering the example of a group assignment 40 in FIG. 6, responder elements numbered 1 to 11 are each assigned one or more groups. In this example, responder elements 1 to 3 are each assigned a first group G1 and a second group G2. Responder elements 4 to 6 are each assigned the group G1. Responder elements 7 to 9 are each assigned the group G2. Responder elements 10 and 11 are each assigned a group G3.

The shown example of a group assignment 40 thus defines a first group G1 comprising responder elements 1 to 6, a second group G2 comprising responder elements 1 to 3 and 7 to 9, and a third group G3 comprising the responder elements 10 and 11. The group assignment 40 may be defined statically. For example, the group assignment 40 may be implemented in hardware using one or more bit masks, multiplexers or other forms of logic.

The protection unit 36 may further be arranged to provide a group authorization list 42 (FIG. 7). The group authorization list 42 may assign a set of access requirements to each group of the group assignment 40. In this example, the groups G1, G2, and G3 are assigned, for example, the following sets of access requirements, respectively: us-r, s-r, and s-rw. The group assignment 40 in conjunction with the group authorization list 42 may thus assign one or more sets of access requirements to each responder element 15 of the respective responder unit 14.

The assignment of protection groups as described with reference to FIGS. 6 and 7, e.g., protection groups G1, G2, and G3, may thus allow definition of a set of access requirements for a group of responder elements by means of a single entry. For example, the first protection group defined by the group assignment 40, i.e., the group of responder elements 1 to 6 as identified by the group G1, may be assigned the set of protection requirements us-r by means of a single entry of the group authorization list 42 in FIG. 7. Compared to an alternative design in which each responder element is assigned a set of access requirements directly, i.e., without an assignment of protection groups to the various responder elements, the hardware that is necessary for defining the access requirements and for evaluating a request can be significantly reduced. Furthermore, the proposed grouping of responder elements into protection groups may render the protection scheme more transparent for both developers and customers.

It is, however, pointed out that a protection group, i.e., a group implemented by the group assignment, may consist of a single responder element. For instance, the group assignment 40 may further assign a group G4 (not shown) to a given responder element wherein the given responder element is the only responder element in the group G4. A very fine protection granularity may thus be achieved.

It is further noted that a protection group, e.g., group G1, may have an address range that may be discontinuous. A protection group may, for example, contain a first responder element 15 and a second responder element 15 and not contain a third responder element with an address that is intermediate between the address of the first responder element and the address of the second responder element.

As described above, each of the responder elements 15 may have an address and may be addressable individually by means of its address. Any given responder element 15 may thus be addressed individually and yet be protected as part of a protection group that may comprise further responder elements.

Each protection group defined by, e.g., the group assignment 40, may, for instance, be associated with a particular function or functionality provided by the respective group of responder elements 15. In the example of FIG. 6, for instance, groups G1, G2, and G3 may relate to a first, second, and third function associated with the respective group of responder elements 15. For instance, responder elements numbered 1 to 6 (group G1) may be required for providing a timer function associated with a first timer (not shown); elements numbered 1 to 3 and 7 to 9 (group G2) may be required for providing a timer function associated with a second timer (not shown), and elements 10 and 11 (group G3) may be required to provide a timer function associated with a third timer (not shown). It is noted that any responder element 15 may be shared among two or more functions. Such responder elements may be referred to as common elements. For instance, in the example of FIG. 6, responder elements number 1, 2, and 3 may be shared among the three timer functions.

Each protection unit 36 may, for example, be implemented either as a protection wrapper or as protection companion, as schematically illustrated in FIGS. 8 and 9. Referring to FIG. 8, the protection wrapper 36 may be arranged to inhibit or to abort a requested access to one or more responder elements 15 within the associated responder unit 14. In contrast, the protection companion 14 of FIG. 9 may be arranged to take the role of an observer which does not inhibit or abort access to the responder unit 14 but merely provides the second request evaluation result. A request evaluation result may, for instance, be provided to the requesting requestor unit, e.g., to one of the units 12, or to a central access control unit (not shown) that may be shared among several responder units 14.

The SoC 10 may operate (FIG. 5), for example, as follows. The access control unit 18 and the protection unit 36 may receive from a requesting actor, e.g., from a task running on one of the requestor units 12, the request for access 34 (blocks 60 and 64) to one or more target responder elements 15' (mentioned above in relation to FIG. 1) among the responder elements 15 within a target responder unit 14. The request may have a set of request properties. The access control unit 18 may then determine (block 62) for the received access request a corresponding set of access requirements from the authorization list 38 with respect to the address identified in the request for access 34. The determination may be performed using, for example, the table described above in relation to FIG. 3. Using the data obtained from the table, the access control unit 18 may evaluate (block 64) the request for access and the set of requested access requirements communicated therewith in order to identify the access requirements in the selected set of access requirements that are met, and generate a first request evaluation result constituting the result of the evaluation (block 64).

Figure 5:
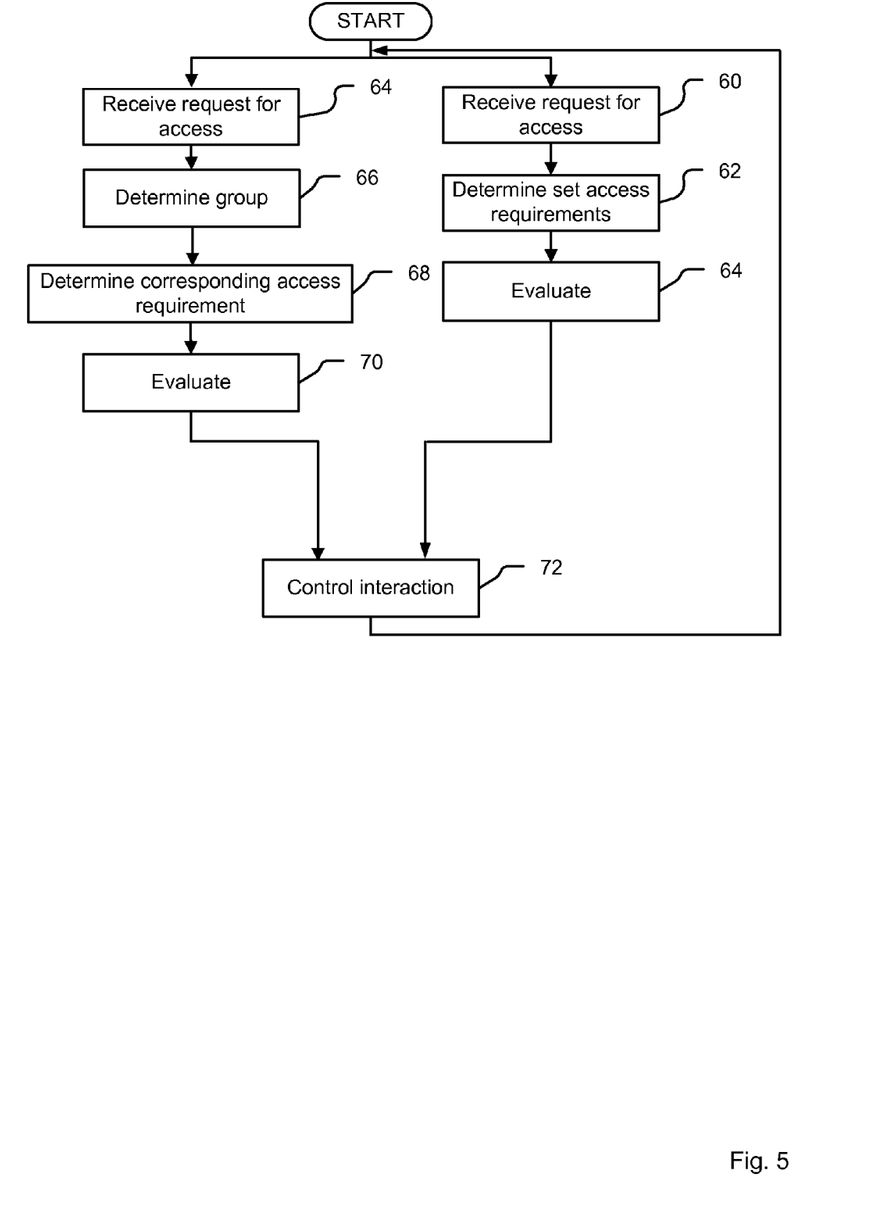
FIG. 5 is a flow chart of an example of operation of the system-on-chip of FIG. 1.

Subsequently or substantially simultaneously, the protection unit 36 may also receive (block 64) the request for access 34 to the one or more target responder elements 15' among the responder elements 15 of the respective responder unit 14. The protection unit 36 may further determine (block 66), for each of the target responder elements 15', the corresponding group, e.g., G1, from the group assignment 40. It may then further determine (block 68) the corresponding one or more sets of access requirements, e.g., us-r, for each of the selected groups from the group authorization list 42. The protection unit 36 may then further evaluate (block 70) the request with respect to the thus determined set of access requirements to generate a second request evaluation result. The second evaluation result may indicate an extent to which the request conforms to this set of access requirements. For example, the request evaluation result may simply indicate whether or not the request conforms to this set of access requirements.

The protection unit 36 may further be arranged to perform one or more of the following actions in dependence on the request evaluation result: grant the request, refuse the request, abort the access requested by the request, and/or generate an error indication.

However, in this example the control logic 52 receives the first and/or second request evaluation result and may control interaction with the responder unit 14 or the target responder element 15' in response to the first and/or second request evaluation result. The control of the interaction with the target responder element 15' may be one or more of: granting the request, inhibiting the request, or aborting an access initiated in response to the request. Additionally or alternatively, the control logic 52 may generate an error indication 54 and the error indication 54 may be communicated to an appropriate recipient (not shown) within the SoC 10 when access to a target responder unit 15' is being inhibited or aborted, the communication of the error indication being in dependence of the first and/or second evaluation results.

In another example (FIG. 10), a further group assignment 40' may be provided and a further group authorization list 42' may be provided by the protection unit 36 in order to control access to the target responder element 15' so as to provide improved protection capabilities, for example in terms of improved flexibility and/or granularity. The protection unit 36 may select between the group assignment 40 and the further group assignment 40' in response to evaluating a predetermined criterion. Additionally or alternatively, the protection unit 36 may select between the group authorization list 42 and a further group authorization list 42' in response to evaluating the predetermined criterion mentioned above.

Figure 10:
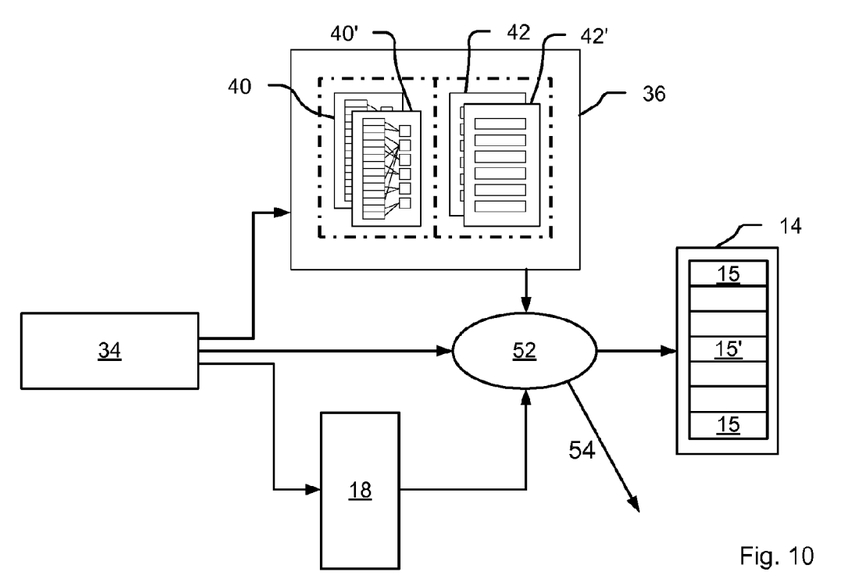
FIG. 10 is a schematic diagram of another example of the portion of the system-on-chip of FIG. 4 constituting another embodiment of the invention.

As also mentioned above, each responder unit 14 may have a set of address spaces associated therewith, resulting in more than one address corresponding to the target responder element 15'. The criterion may therefore be an address space of the set of address spaces within which the address corresponding to the target responder element 15' falls, the address being communicated in the request for access 34. It should be appreciated that the authorization list 38 may comprise more than one entry respectively corresponding to different address spaces associated with accessing the same target responder element 15'.

In another example (FIG. 11), in order to provide improved protection capabilities, for example in terms of improved flexibility and/or granularity, another of the protection units (a further protection unit 36') may provide a further group assignment 40'. Additionally or alternatively, the further protection unit may provide a further group authorization list 42'. In this regard, the target responder element 15' may have a first access path 80 associated with the protection unit 36 and a second access path 82 associated with the further protection unit 36'. The address space mentioned above may be associated with the first access path 80 and a further address space may be associated with the second access path. Using the address identified in the request for access 34, the first access path 80 or the second access path 82 may be selected depending upon whether the address identified in the request for access falls within the address space or the further address space. Additionally, other criterion, e.g. existing connectivity might be used to select one of the available access paths. It should be appreciated that the authorization list 38 may comprise more than one entry respectively corresponding to different address spaces associated with accessing the same target responder element 15'.

Figure 11:
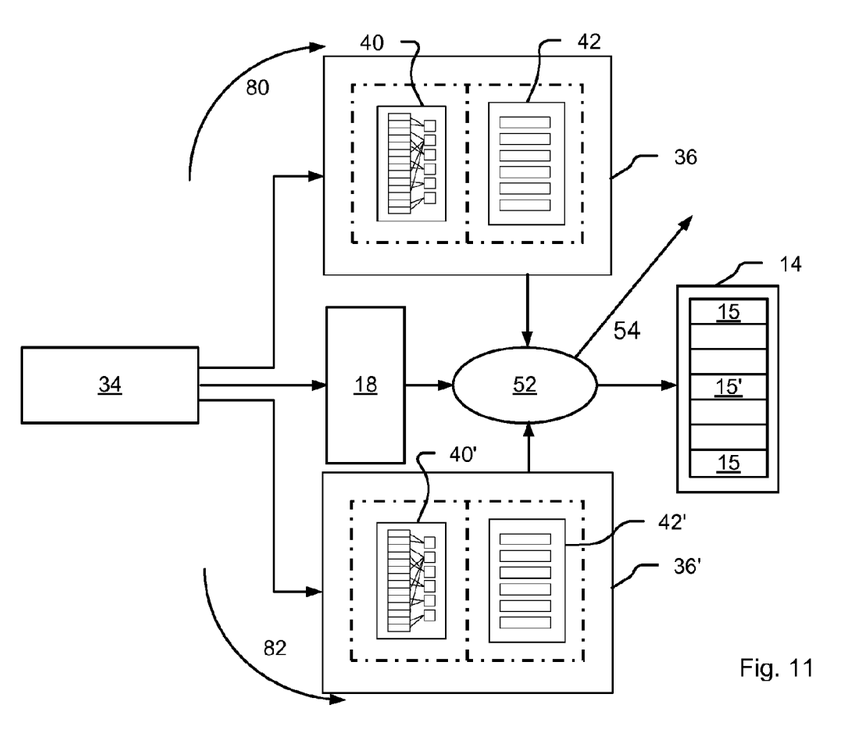
FIG. 11 is a schematic diagram of yet another example of the portion of the system-on-chip of FIG. 4 constituting yet another embodiment of the invention.

In yet another example, the further protection unit 36' mentioned above may assign another group in the further group assignment 40', for example G5, to each of the responder elements 15 of the responder unit 14. This group G5 may be different from the group already assigned by the protection unit 36. In this regard, the further group authorization list 42' may assign a further set of group access requirements to the group mentioned above or the another group G5 assigned by the further protection unit.

In the foregoing specification, the invention has been described with reference to specific examples of embodiments of the invention. It will, however, be evident that various modifications and changes may be made therein without departing from the broader spirit and scope of the invention as set forth in the appended claims.

Each authorization list described herein may be implemented by listing one or more allowed access operations or equivalently by listing one or more forbidden access operations.

The group assignment 40 or the group authorization list 42 or both may be static or programmable. For example, they may be statically implemented in non-programmable hardware or made programmable by providing means to modify the selected functionality.

It is pointed out that the different protection units 36 may differ in their group assignment 40 or in their group authorization list 42 or in both. For example, the set of protection units 36 of the SoC 10 may comprise a first protection unit 36 and a second protection unit 36', and the group assignment 40 provided by the first protection unit 36 may differ from a group assignment 40' provided by the second protection unit 36'. The group protection scheme described herein may thus be adapted individually to each protection unit 36. Similarly, the group authorization list 42 provided by the protection unit 36 may differ from the further group authorization list 42' provided by the same protection unit 36. Similarly, the group assignment 40 provided by the protection unit 36 may differ from the further group assignment 40' provided by the same protection unit 36

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A system-on-chip comprising:
a responder unit comprising a set of responder elements;
an access control unit associated with an authorization list and the responder unit, an entry of the authorization list defining a set of access requirements in relation to an address space identifying at least part of the responder unit; wherein the access control unit is arranged to:
receive a request for access to a target responder element among the responder elements of the responder unit;
determine a corresponding set of access requirements for the received access request from the authorization list; and
evaluate the request for access with respect to the determined set of access requirements and generate a first request evaluation result; and
a protection unit associated with the responder unit, the protection unit being arranged to:
provide a group assignment assigning a group to each of the responder elements of the responder unit;
provide a group authorization list, an entry of the group authorization list defining a set of group access requirements for the group assigned;
receive the request for access to the target responder element;
determine the group assigned to the target responder element from the group assignment and further determine the set of group access requirements from the group authorization list for the group assigned; and
evaluate the request with respect to the determined set of group access requirements and generate a second request evaluation result; and
wherein:
interaction with the target responder element is controlled in response to at least one of the first and second evaluation result, and
the protection unit is arranged to provide at least one of a further group assignment and a further group authorization list to control access, when in use, to the target responder element, and select between at least one of the group assignment and the further group assignment, and the group authorization list and the further group authorization list in response to evaluating a predetermined criterion.

2. A system-on-chip as claimed in claim 1, wherein the protection unit is further arranged to control interaction with the target responder element by performing one or more of the following in dependence of the at least one of the first and second evaluation results:
grant the request for access; inhibit the request for access; or abort access initiated in response to the request.

3. A system-on-chip as claimed in claim 1, wherein the protection unit is further arranged to generate an error indication and is configured to communicating the error indication in dependence of the at least one of the first and second evaluation results when access to the target responder element is being inhibited or aborted.

4. A system-on-chip as claimed in claim 1, wherein the evaluating the predetermined criterion is selection of the address space associated with an address identified in the received access request, the selection being made from a set of address spaces associated with the responder unit comprising the target responder element.

5. A system-on-chip as claimed in claim 1, comprising:
a further protection unit arranged to provide at least one of a further group assignment and a further group authorization list; wherein
the target responder element has a first access path associated with the protection unit and a second access path associated with a further protection unit.

6. A system-on-chip as claimed in claim 5, wherein the first access path is associated with the address space and the second access path is associated with a further address space; and
the address identified in the received access request is used to select the first access path or the second access path.

7. A system-on-chip as claimed in claim 5, wherein the further protection unit is arranged to assign another group to each of the responder elements of the responder unit, the another group being different from the group assigned by the protection unit.

8. A system-on-chip as claimed in claim 1, wherein the further group authorization list assigns a further set of group access requirements to the group or the another group.

9. A system-on-chip as claimed in claim 1, wherein the authorization list comprises a plurality of entries including the entry, each of the plurality of entries defining a respective set of access requirements in relation to a respective address space; and the access control unit is arranged to select the entry associated with the address identified in the received access request identifying the part of the responder unit containing the target responder element.

10. A vehicle comprising the system-on-chip as claimed in claim 1.

11. An integrated circuit comprising:
a responder unit comprising a set of responder elements;
an access control unit associated with an authorization list and the responder unit, an entry of the authorization list defining a set of access requirements in relation to an address space identifying at least part of the responder unit; wherein the access control unit is arranged to:
receive a request for access to a target responder element among the responder elements of the responder unit;
determine a corresponding set of access requirements for the received access request from the authorization list; and
evaluate the request for access with respect to the determined set of access requirements and generate a first request evaluation result; and
a protection unit associated with the responder unit, the protection unit being arranged to:
provide a group assignment assigning a group to each of the responder elements of the responder unit;
provide a group authorization list, an entry of the group authorization list defining a set of group access requirements for the group assigned;
receive the request for access to the target responder element;
determine the group assigned to the target responder element from the group assignment and further determine the set of group access requirements from the group authorization list for the group assigned; and
evaluate the request with respect to the determined set of group access requirements and generate a second request evaluation result; and wherein:
interaction with the target responder element is controlled in response to at least one of the first and second evaluation result, and the protection unit is arranged to provide at least one of a further group assignment and a further group authorization list to control access, when in use, to the target responder element, and select between at least one of the group assignment and the further group assignment, and the group authorization list and the further group authorization list in response to evaluating a predetermined criterion.

12. A method of protecting a responder unit in a system-on-chip comprising a set of responder elements, the method comprising:

provide an authorization list, an entry of the authorization list defining a set of access requirements in relation to an address space identifying at least part of the responder unit;

receiving a request for access to a target responder element among the responder elements of the responder unit;

determining a corresponding set of access requirements for the received access request from the authorization list; and evaluating the request for access with respect to the determined set of access requirements and generate a first request evaluation result;

providing a group assignment assigning a group to each of the responder elements of the responder unit;

providing a group authorization list, an entry of the group authorization list defining a set of group access requirements to the group;

receiving the request for access to the target responder element;

determining the corresponding group for the target responder element from the group assignment and further determining the corresponding set of group access requirements from the group authorization list;

evaluating the request with respect to the determined set of group access requirements and generate a second request evaluation result; and controlling interaction with the target responder element in response to the first or second evaluation result, wherein the protection unit is arranged to provide at least one of a further group assignment and a further group authorization list to control access, when in use, to the target responder element, and select between at least one of the group assignment and the further group assignment, and the group authorization list and the further group authorization list in response to evaluating a predetermined criterion.

* * * * *